United States Patent [19]
Keckler et al.

[11] Patent Number: 5,574,939
[45] Date of Patent: Nov. 12, 1996

[54] MULTIPROCESSOR COUPLING SYSTEM WITH INTEGRATED COMPILE AND RUN TIME SCHEDULING FOR PARALLELISM

[75] Inventors: Stephen W. Keckler, Cambridge; William J. Dally, Framingham, both of Mass.

[73] Assignee: Massachusetts Institute of Technology, Cambridge, Mass.

[21] Appl. No.: 496,462

[22] Filed: Jun. 29, 1995

Related U.S. Application Data

[63] Continuation of Ser. No. 62,388, May 14, 1993, abandoned.
[51] Int. Cl.$^6$ .................................................. G06F 15/16
[52] U.S. Cl. .................. 395/800; 395/376; 364/230; 364/262.4; 364/DIG 1
[58] Field of Search .................................. 395/375, 800, 395/250; 364/131–134

[56] References Cited

U.S. PATENT DOCUMENTS

| | | | |
|---|---|---|---|
| 4,392,200 | 6/1983 | Arulpragasam et al. | 364/200 |
| 4,482,272 | 11/1984 | Green | 395/375 |
| 4,733,353 | 4/1988 | Jaswa | 364/200 |
| 4,926,323 | 5/1990 | Baror et al. | 364/200 |
| 5,021,945 | 6/1991 | Morrison et al. | 364/200 |
| 5,163,139 | 11/1992 | Haigh et al. | 395/375 |
| 5,179,680 | 1/1993 | Colwell | 395/425 |
| 5,185,878 | 2/1993 | Baror et al. | 395/425 |
| 5,197,137 | 3/1993 | Kumar et al. | 395/375 |
| 5,291,581 | 3/1994 | Cutler et al. | 395/425 |
| 5,357,617 | 10/1994 | Davis et al. | 395/375 |
| 5,404,469 | 4/1995 | Chung et al. | 395/375 |
| 5,442,762 | 8/1995 | Kato et al. | 395/375 |

FOREIGN PATENT DOCUMENTS

| | | |
|---|---|---|
| 0492968A2 | 1/1992 | European Pat. Off. . |
| 0479390A2 | 8/1992 | European Pat. Off. . |

OTHER PUBLICATIONS

Tomasulo, R. M., "An Efficient Algorithm for Exploiting Multiple Arithmetic Units, "*IBM Journal*, Jan. 1967, pp. 25–33.

Fisher, Joseph et al., "Very Long Instruction Word Architectures and the ELI–512, " Association for Computing Machinery, 1983, pp. 140 150.

Smith, Burton J., "Architecture and applications of the HEP multiprocessor computer system," SPIE, vol. 298 Real–Time Signal Processing IV, 1981, pp. 241–248.

Keckler, Stephen W. & Daly, William J., "Processor Coupling: Integrating Compile Time and Runtime Scheduling for Parallelism, " *The Proceedings of the 19th Annual International Symposium on Computer Architecture, May 1992,pp. 202–213*.

Kato et al., "Delayed Instruction Execution on a Long Instruction Word (LIW) Computer, "*Systems and Computers in Japan, vol. 23, No. 14, 1992, pp. 13–22*.

Paver et al., "Register Locking in an Asynchronous Microprocessor," *1992 IEEE International Conference on Computer Design*, 11 Oct., 1992, pp. 351–355.

(List continued on next page.)

*Primary Examiner*—Alpesh M. Shah
*Attorney, Agent, or Firm*—Hamilton, Brook, Smith & Reynolds, P.C.

[57] ABSTRACT

In a parallel data processing system, very long instruction words (VLIW) define operations able to be executed in parallel. The VLIWs corresponding to plural threads of computation are made available to the processing system simultaneously. Each processing unit pipeline includes a synchronizer stage for selecting one of the plural threads of computation for execution in that unit. The synchronizers allow the plural units to select operations from different thread instruction words such that execution of VLIWs is interleaved across the plural units. The processors are grouped in clusters of processors which share register files. Cluster outputs may be stored directly in register files of other clusters through a cluster switch.

28 Claims, 6 Drawing Sheets

OTHER PUBLICATIONS

Lino De Campos, "Asynchronous Polycyclic Architecture," *Second Joint International Conference on Vector and Parallel Processing Conpar 92–VAPP V,* Sep. 1, 1992, Lyon France Sections 2–4 & 6, pp. 387–398.

Wolf et al., "A Variable Instruction Stream Extension to the VLIW Architecture, "*Computer Architeture News,* vol. 19, No. 2, Apr. 1991, pp. 2–14.

"The Metaflow Lighting Chipset", COMPCON Spring '91 IEEE Computer Society Int'l Conference, Bruce D. Lightner.

"The Metaflow Architecture", IEEE Micro, Jun. 1991, Val Popesu.

MULTIPROCESSOR COUPLING SYSTEM WITH INTEGRATED COMPILE AND RUN TIME SCHEDULING FOR PARALLELISM

GOVERNMENT SUPPORT

The United States Government has certain interests in this invention under Contract No. N00014-88-K-0738 with the Department of the Navy, and F19628-92-C-0045 with the Department of the Air Force.

This is a continuation of Ser. No. 08/062,388, filed May 14, 1993, now abandoned.

RELATED PUBLICATIONS

Certain aspects of the present invention are presented in Keckler and Dally, "Processor Coupling: Integrating Compile Time and Run Time Scheduling For Parallelism," the Proceedings of the 19th Annual International Symposium on Computer Architecture, May 19, 1992.

BACKGROUND

In multiple processor systems, various mechanisms have been provided for scheduling instructions in the parallel processors. The goal of any such scheduling mechanism is to assure that the many processors are kept busy through operating cycles to make full use of the available hardware.

One approach to scheduling parallel operations is based on the use of very long instruction words (VLIW), each of which is able to identify multiple operations to be performed in parallel. An advantage of such systems is that the parallelism can be scheduled once by the compiler rather than during run time with each execution of the program. Where data dependencies allow, the compiler schedules plural operations in the VLIW for simultaneous execution. However, compile time scheduling is limited by unpredictable memory latencies and by some dependencies, such as data dependent array references, which cannot be statically determined. Furthermore, branch boundaries tend to limit the number of operations that can be scheduled simultaneously. Consequently, applications exhibit an uneven amount of instruction level parallelism during their execution. In some parts of a program, all of the function units will be used, while in others serial computations with little instruction level parallelism dominate. Further, the amount of available parallelism depends on both the computation on hand and the accessibility of data. Long memory latencies can stifle the opportunities to exploit instruction level parallelism.

Another scheduling technique which can be performed by a compiler is that of separating the program into threads of computation which can be directed to separate processors. These systems suffer periods of time during which an insufficient number of threads can be identified for filling the plural processing units.

A multithreading approach combines the above two approaches with some success. In that approach, the VLIW approach is supplemented with the ability to switch between threads during periods of long idle latency of a thread being processed. Thus, the system maintains the fine instruction level parallelism, but fills the periods of latency with VLIW processing of other threads. However, the system still suffers from the problem of non-uniform instruction level parallelism within each thread.

SUMMARY OF THE INVENTION

In accordance with the present invention, plural sequences of instruction words are provided for respective threads of computation. Each instruction word is a very long instruction word (VLIW) comprising fields for identifying plural operations able to be performed in parallel for the respective thread of computation. In a processing cycle, parallel processors may execute operations from an instruction word in parallel. Further, the parallel processors are shared by the threads of computation and may process operations from different instruction words of different threads of computation such that execution of threads is interleaved across the plural processors. As a result, the compiler is able to establish instruction level parallelism; and during execution, thread level parallelism is obtained not only by switching between threads during periods of latency but also by the simultaneous execution of operations from different threads of computation. The system thus obtains parallelism at both the instruction and thread levels simultaneously.

A preferred parallel data processing system embodying the present invention comprises a plurality of processing units and memory having stored therein sequential multiple-operation instruction words for each of plural threads of computation. Each instruction word comprises plural fields, each field identifying an operation for one of the plurality of processing units. Each processing unit includes a synchronizer for selecting one of plural threads of computation for execution in that unit. The unit then executes the operation identified in the respective field of the instruction word for the selected thread of computation. The synchronizer assures that all operations of an instruction word in a thread are executed by the plural units before any unit executes an operation of the subsequent instruction word of the same thread, but the synchronizer allows parallel units to simultaneously execute operations from different thread instruction words.

In a preferred system, each processing unit comprises a processing pipeline which includes the synchronizer as one stage thereof. The synchronizer stage comprises an operation buffer for storing operations with operand data for each of plural threads of computation prior to execution. Operand data output from the pipeline may be written directly back into the operation buffer. A read register stage precedes the synchronization stage. The read register stage reads operands from a register file and supplies those operands to the operation buffer.

A control signal links the synchronizers of plural processing units for each thread of computation. A control signal indicates whether all operations of an instruction word have been issued and thus allows the synchronizer to select for execution an operation from the next instruction word for that thread of computation. Regardless of whether all operations have issued for an instruction word, when an operation is issued for execution in a pipeline, an operation indicated by the next instruction word for the same thread of computation is fetched. The pipeline is thus kept full even though the next operation may have to be delayed in the operation buffer until the full instruction word has issued.

Preferably the processing units are grouped in clusters, each cluster of one or more processors sharing a separate register file. A cluster bus system provides direct writing of data from the output of one cluster to the register file of another cluster. A preferred bus system includes a bus to write data into each cluster and an arbitration system for arbitrating plural writes to a cluster from different clusters.

The processing units are able to execute an operation which causes transfer of data from one cluster to a register of another cluster.

The register file may comprise a flag for indicating when valid data is not present in a register. The flag is set to indicate that data is not present during the latency of a load operation. To assure that the flag is set during a transfer of data from the register of one cluster to the register of another cluster, the receiving processing unit executes an operation which sets a flag in a register of the receiving cluster. That operation is included by the compiler in an instruction word of the receiving processing unit which precedes the transfer operation of the transferring processing unit.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views.

DETAILED DESCRIPTION OF PREFERRED EMBODIMENT

Figure 1:
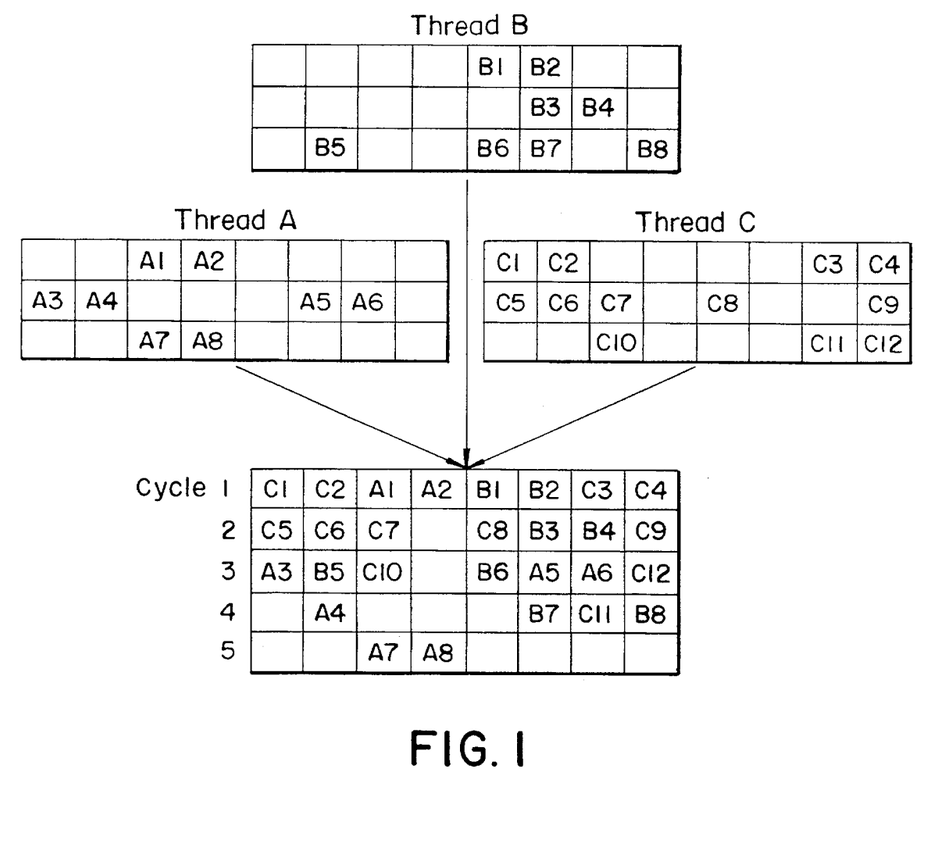
FIG. 1 illustrates interleaving of VLIW instruction streams in accordance with the present invention.

FIG. 1 demonstrates how processor coupling dynamically interleaves instruction streams from multiple threads across multiple function units. The operations from threads A, B, and C are scheduled independently at compile time as shown in the top of the figure. Each column in a thread's instruction stream represents an operation field for a single function unit. Each row holds operations that may be executed simultaneously. The empty boxes indicate that there is insufficient instruction-level parallelism to keep all of the function units busy. In a prior VLIW system, the parallel processors would process only one thread at a time, so a processor would remain idle at each of the empty boxes. In a multithreading system, the system would switch from one thread to another during periods of latency of a thread such as when data is being fetched from memory. Though the system would not remain idle during memory latency, individual units would still remain idle at the empty boxes.

In accordance with the present invention, the very long instruction word sequences of the several threads of computation are interleaved. During execution, arbitration for function unit usage is performed on a cycle by cycle basis. When several threads are competing for a given function unit, one is granted use and the others must wait. The bottom box shows a runtime interleaving of these threads in which some operations are delayed due to function unit conflicts. For example, operations A3 and A4 are locked out during the second cycle because thread C is granted those units instead.

Note that operations scheduled in a single long instruction word need not be executed simultaneously. Allowing the static schedule to slip provides for finer grain sharing of function units between threads. In FIG. 1, operations A3–A6 are scheduled in the same instruction word for thread A. Operations A3, A5, and A6 are all issued during cycle 3 while A4 is not issued until cycle 4. However, A4 must be issued before A7 and A8.

Processor coupling is useful in machines ranging from workstations based upon a single multi-ALU node to massively parallel machines such as the MIT M-Machine, which is currently being designed. The M-Machine comprises thousands of multi-ALU, processor-coupled nodes and has many threads to be interleaved at each node. The machine will thus take advantage of a hierarchy of parallelism, ranging from coarse-grained algorithmic parallelism to extremely fine-grained instruction-level parallelism. However, processor coupling can be effective on only a single node. Presented here is a single node instance of processor coupling in accordance with the present invention using the M-Machine design.

The M-Machine comprises a number of nodes connected by a 3-D mesh interconnection network. Each node is made up of a multi-ALU processor (MAP) chip and four high-bandwidth dynamic memory chips. Eight hardware thread slots are provided to allow up to eight threads to run simultaneously on each node.

Figure 2:
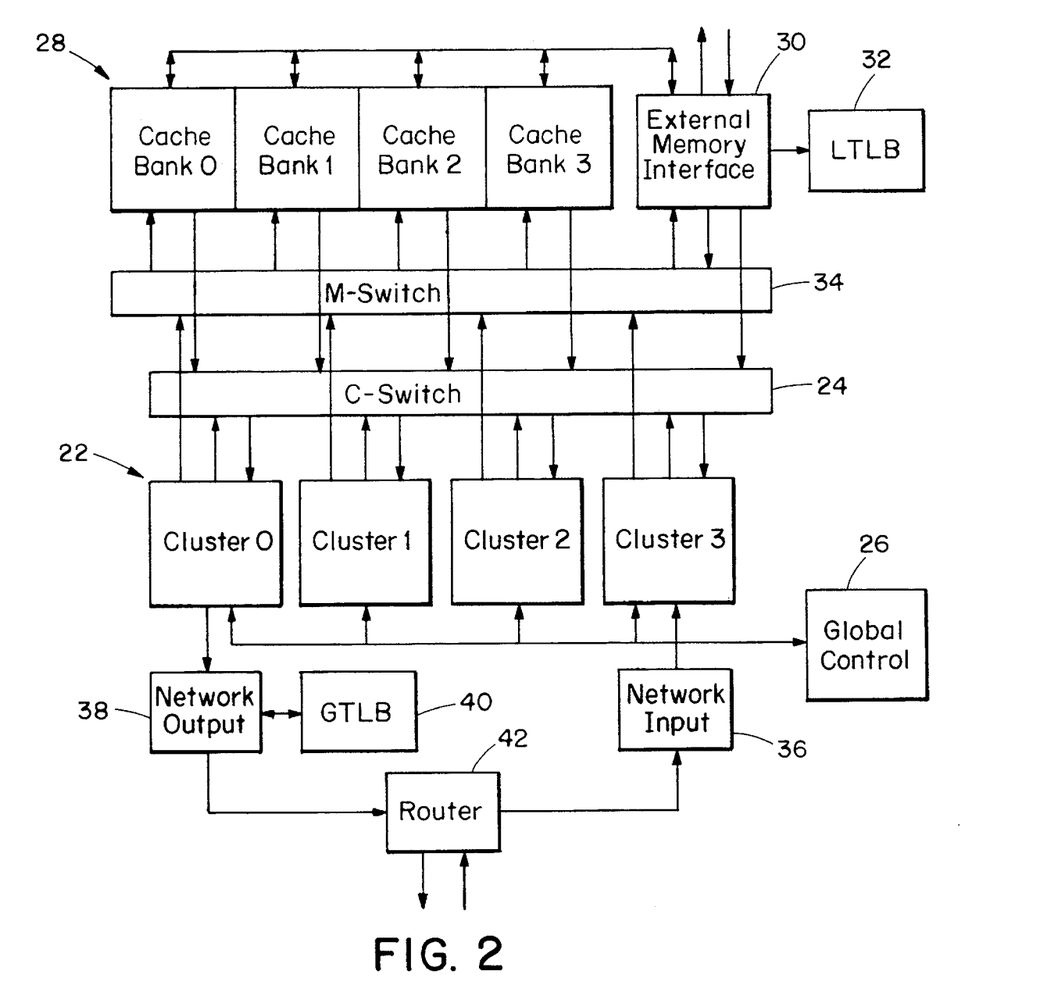
FIG. 2 illustrates the main components and functional blocks of a multiprocessor chip embodying the present invention.

A block diagram of the MAP chip is shown in FIG. 2. It comprises the following subsystems:

1. Four arithmetic clusters 22,
2. Cluster switch (C-Switch) 24,
3. Global control unit 26 (coordinates operation of the clusters and the C-Switch),
4. Four cache memory banks 28,
5. External memory controller 30 with local translation lookaside buffer (LTLB) 32,
6. Memory switch (M-Switch) 34,
7. Network input controller 36,
8. Network output controller 38 with global translation lookaside buffer (GTLB) 40, and
9. Network router 42.

The following is a brief description of the function of each of the components of the MAP chip. Each subsystem will be described in more detail subsequently.

An M-Machine instruction consists of 12 operation fields, one for each operation unit, there being three operation units per cluster. Each cluster contains an integer operation unit, a floating-point operation unit and a memory interface operation unit, as well as an integer register file and a floating-point register file. Data may be transferred from one cluster 22 to another by writing a value directly into a remote register file via the Cluster Switch (C-Switch) 24. Special MOVE operations (IMOV, FMOV) are used to transfer data between clusters through the C-Switch thus avoiding traffic and lost transfer cycles through the M-Switch 34 and cache banks 28. The memory interface unit issues load and store requests to the memory system via the Memory Switch (M-Switch) 34 which routes a request to the appropriate cache bank 28.

The Global Control Unit (GCU) 26 is responsible for synchronizing the clusters, as discussed in detail below, and transmitting globally shared control data, such as condition code register values. The GCU reads a NOT_STARTED line for each thread slot from the cluster to determine when a particular instruction has issued all of its operations. It uses this information to decide when to increment a Thread Instruction Pointer (TIP). Locally, each operation unit manages its own instruction sequencing by advancing its Local Instruction Pointer (LIP), keeping in synchrony with the other units by snooping on the NOT_STARTED line. When a branch occurs, the branch target is broadcast to all of the function units by the GCU. The GCU also holds thread slot specific data such as a Timeout Count Register, a Timeout Limit Register, and a control word containing HALT and ACQUIRED bits. Finally, the Global Control Unit sequentializes the handling of faulting operations.

The Cluster Switch (C-Switch) 24 is a crossbar switch with four buses. Each bus is connected directly to both of the register files in a cluster. There are 13 possible sources that may drive a bus: four integer arithmetic units (one per cluster), four floating-point arithmetic units (one per cluster), four cache banks, and the external memory interface. Data requested by load instructions are transmitted to register files via the C-Switch. The C-Switch includes arbitration logic for these buses. The priority is fixed in hardware with the cache banks having the highest priority.

The M-Switch 34 routes memory system requests from the processor clusters to the Cache Banks and the External Memory Interface. The M-Switch is constructed in much the same manner as the C-Switch, containing five buses, one connected to each of the cache banks, and one connected to the External Memory Interface. The M-Switch performs arbitration, only allowing one of the input units to drive each of the buses on a given cycle. The arbitration scheme is fixed in hardware, with round robin priority given to the different clusters.

The four Cache Banks are used as a cache memory by the MAP. Each bank contains 128 KBytes of memory as well as sufficient memory to store the cache tag and presence bits. Addresses are interleaved across the Cache Banks in order to reduce bank conflicts due to multiple processor clusters attempting to access the same bank during the same cycle. Each Cache Bank may also access the TLB 32 and external memory interface (EMI) 30 so that cache misses may be handled in hardware. Arbitration for the TLB and EMI is also performed in a round robin fashion.

The External Memory Interface 30 handles communication between the MAP chip and the local off-chip memory. An M-Machine node contains 1 MWord of off-chip memory (four 16 Mbit high-bandwidth DRAM chips). However, the interface provides sufficient address lines to support external memory of up to 256 MWords per MAP chip. The bandwidth between the EMI and the off-chip memory is 1 word/cycle.

The Local Translation Lookaside Buffer (LTLB) 32 caches virtual to physical address translations for data that is stored in the local off-chip memory. Page sizes in the LTLB are fixed at 1 KWord, and the LTLB maintains a valid bit for each cache line within a page, so that an entire local page of data need not be brought onto the node whenever a new local page is allocated.

The Global Translation Lookaside Buffer (GTLB) 40 caches translations between virtual addresses and node identifiers. This allows relocation of data across different nodes of the M-Machine. Page sizes in the GTLB are variable, and may be any power of 2 multiple of the LTLB page size, including the full address space of the machine. The GTLB also provides support for mapping a single GTLB page across multiple nodes, allowing data structures to be distributed across the entire machine or certain subsets of the nodes.

Messages are assembled in message composition registers which are distributed across the clusters. Send operations may be executed in Cluster 0, which transmits the assembled message into the network output unit 38 (NetOut). There the message is partitioned into flits, and the necessary control information is attached. The NetOut unit accesses the GTLB 40 to obtain the translation from a virtual address to physical node address needed to route the message. A small NetOut buffer (nominally 16 words) is provided to match transmission rates with the network.

The network input unit (NetIn) 36 includes a port on the network and two fixed size hardware message queues, one for each priority in the network. When a message arrives, it is deposited in the appropriate message queue; a message handling thread running in the corresponding thread slot is responsible for removing the message from the queue and handling it.

Dedicated adaptive routers 42 are employed in the M-Machine. There are four virtual channels (VC) in each of the X, Y, and Z directions. Ownership of the physical channels is arbitrated among the virtual channels on a flit-by-flit basis, except the NetIn (Extract) and NetOut (Inject) physical channels, which are granted on a message-by-message basis.

Figure 3:
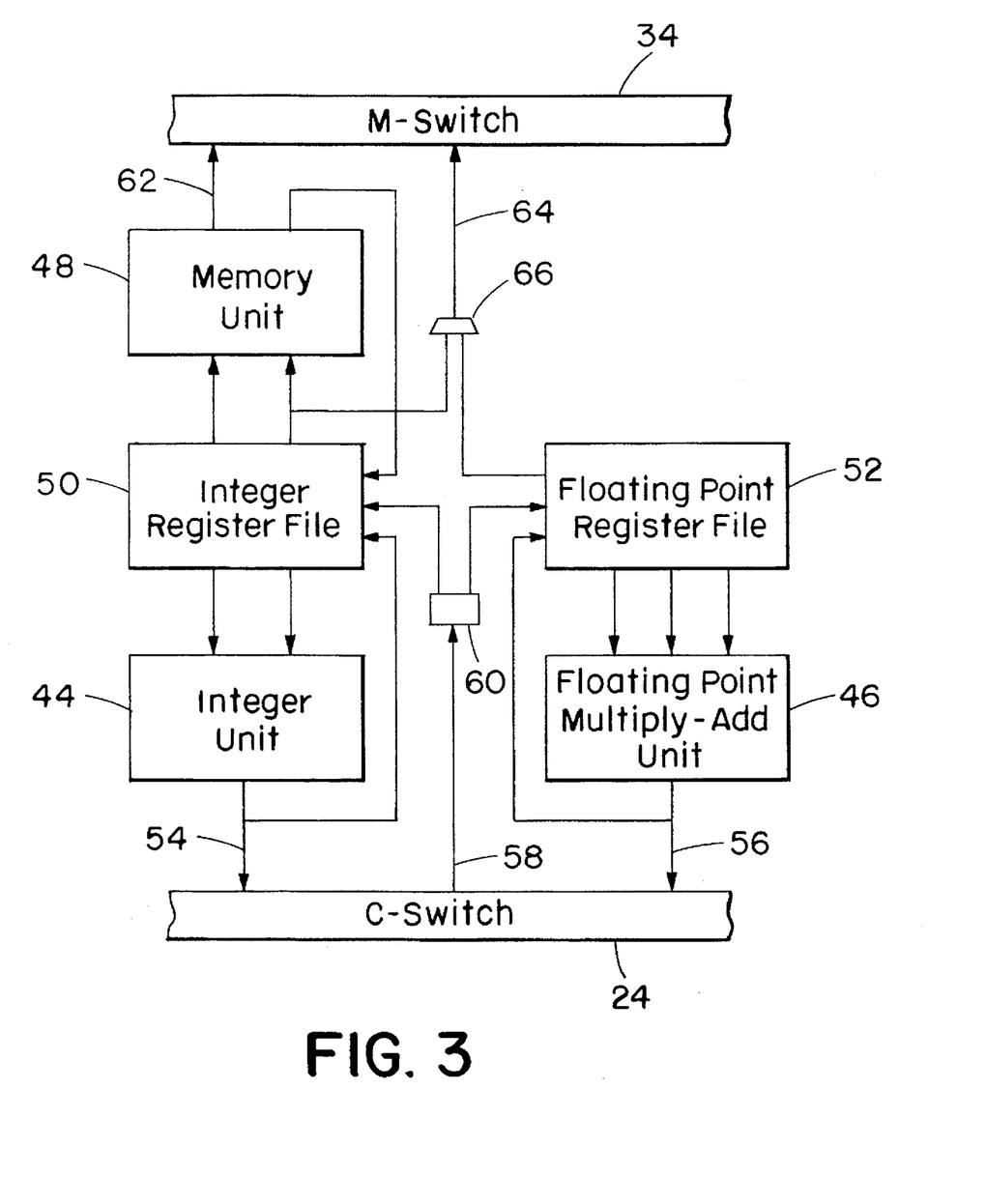
FIG. 3 illustrates the components of a cluster of FIG. 2.

The structure of a cluster is shown in FIG. 3. As noted below, each of the four processor clusters contains an integer unit 44, a floating-point unit 46, a memory unit 48, an integer register file 50, and a floating-point register file 52. The integer and memory units are connected to the integer register file, while the floating-point unit uses the floating-point register file. Although the function units are grouped to share register file access, they may each issue operations independently. A MAP instruction is a VLIW of 12 operations, one for each function unit of each cluster.

Each cluster has a specialized function in addition to the normal arithmetic and memory operations. Cluster 0 may execute send operations that transmit messages into the network and fork operations that cause a new thread to begin executing. A message is composed in registers in cluster 0 and is sent to the Network Output module 38 which is responsible for depositing it into the network through the router 42. Cluster 1 may execute branch operations that change the flow of control of the thread executing the operation. Cluster 2 may execute divide and square-root operations. Finally, Cluster 3 may access the network input and event queues.

The interface between a cluster and the rest of the system can be described in terms of data lines and control lines. The data interface is comprised of the connections to the M-Switch and C-Switch. The path 54 from the integer ALU to the C-Switch has a 65 bit bus I_OUT; the corresponding floating-point path 56 has bus F_OUT. The path 58 has a 65 bit input bus from the C-Switch into the cluster C_DATA. Internally, the cluster may route the data to either the integer or the floating-point register file through a switch 60. Each of these data buses has corresponding control signals (I_ADDR, F_ADDR, and C_ADDR) to determine which cluster, register file, and register is written.

The paths 62 from the memory unit in the cluster to the M-Switch include a 62 bit address bus M_ADDR, and a 65 bit data bus M_DATA. The address bus encodes the address of the access, protection state of the access, and the type of access so that the memory system can perform the appropriate actions. The path 64 to the M-Switch receives data from either register file through a multiplexer 66. In addition, the M-Switch and C-Switch each have STALL lines returning to the function units in the clusters so that the function unit may be stalled if it is not granted arbitration. All of M-Switch and C-Switch buses in and out of the clusters are shared among all of the thread slots.

Figure 4:
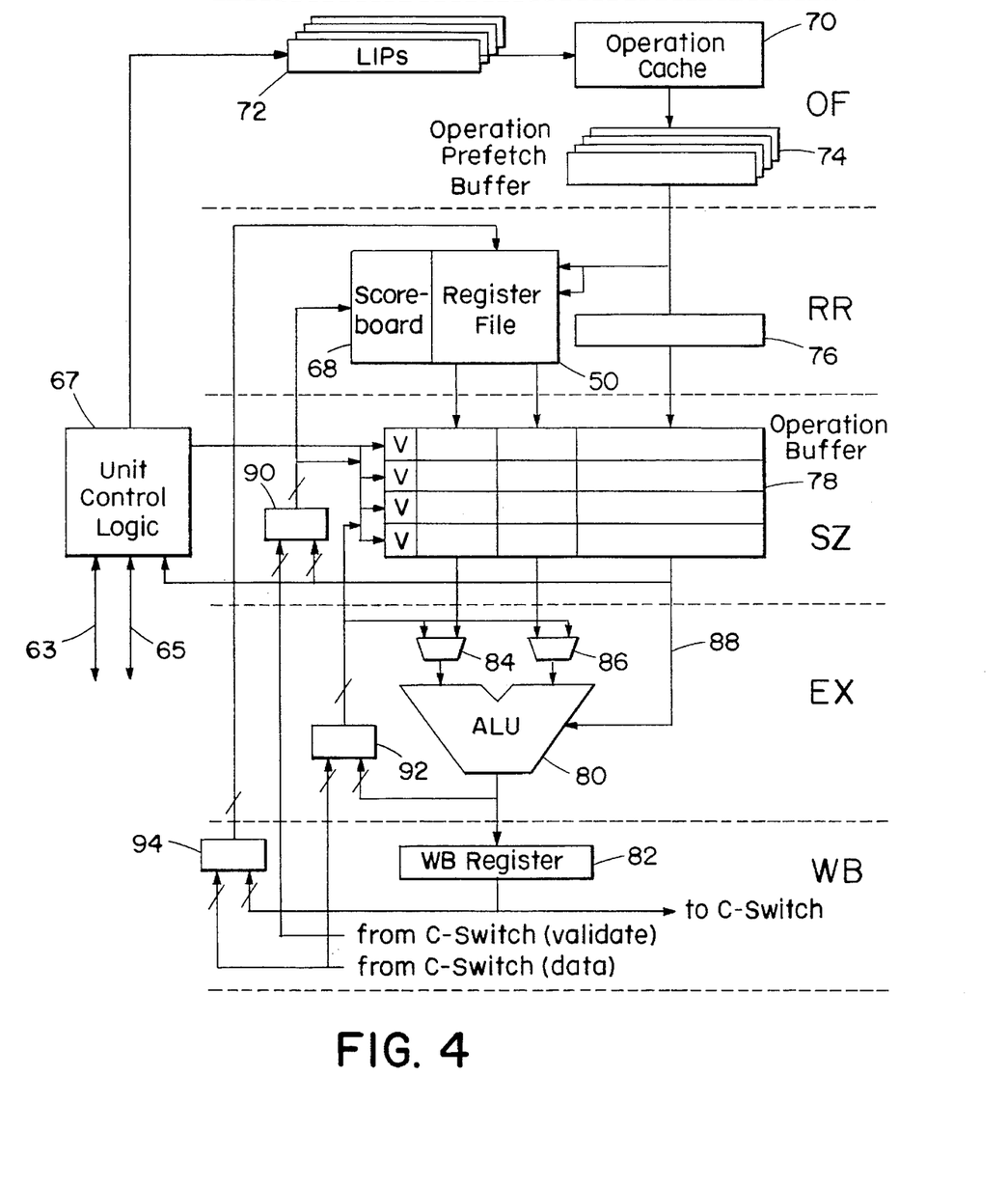
FIG. 4 illustrates a processing pipeline in a cluster of FIG. 2.

Additional control signals synchronize and sequence the function units across the clusters through control logic 67 in each function unit (FIG. 4). Each function unit has the following connections to the global control unit for each thread slot:

Inputs:
1. Condition register lines 65: 16 wires per thread slot (eight condition registers each with 1 value bit and 1 synchronization bit).
2. The NOT_STARTED line 63: This is a wired-or line spanning all of the clusters that each unit may observe and optionally assert. If the unit has not issued the operation from the current instruction (pointed to by the TIP), it deasserts this signal.

Outputs:
1. Condition register values: four wires per thread slot (two condition registers.)
2. The NOT_STARTED line.

There is also a broadcast branch target bus. When a branch executes in cluster 1, the target address is broadcast to the function units in all of the other clusters. Only one branch bus is required to service all of the thread slots.

As discussed in detail below, the MAP chip has hardware for eight thread slots, so that eight different threads may be active simultaneously, each issuing its own instructions and using its own status and data registers. The local control of each function unit is responsible for interleaving in time the operations from the different threads.

The function of each component of the cluster as illustrated in FIG. 3 is summarized below.

The integer unit 44 executes integer arithmetic operations and performs address calculations. It can simultaneously read two operands and write a result to the local integer register file. To transmit a value to a remote register file, it executes a move operation which arbitrates for the C-Switch to deliver the result.

The floating-point unit 46 performs floating-point operations, integer multiplies, and integer to floating-point and floating-point to integer conversions. It also is able to perform pipelined multiply-accumulate operations. The floating-point unit can read as many as three operands from the floating-point register file and can write to the same local register file. Again, remote register files are accessed using explicit move operations. The floating-point unit in Cluster 2 additionally includes divide/square-root capability to perform floating-point divide, floating-point square-root and integer divide operations. The divide/square-root unit may be unpipelined.

The memory unit 48 initiates all memory accesses and performs pointer arithmetic. The memory unit has access to two integer register read ports, one integer register write port, and one floating-point register read port. The address of the access must be specified as a pointer in an integer register. For store operations, the other register read port is used to specify the value to store. This may come from either the integer register file or the floating-point register file. For load operations the pointer is specified by one source operand and an optional offset is specified by the other. This offset can be added to the pointer with the result stored back into the integer register file overwriting the original pointer. The pointer (before modification) and data are sent to the M-Switch for arbitration into the memory system. The data requested by load operations are routed from the memory banks to their destination clusters via the C-Switch.

The memory unit can perform address calculations without issuing a memory operation. The hardware to perform segment checking resides in both the integer unit and the memory unit so both units may perform pointer arithmetic.

The general registers 50 and 52 are implemented in Named State Register Files (NSRF) in which physical registers are mapped to virtual register names as required. The NSRF decoder maintains this mapping. The integer register file has four read ports and 3 write ports. The floating-point register file has four read ports and two write ports. Each register has a dirty bit which specifies whether the register has a more recent value than its memory mapped location in the context. This is used to reduce the number writes to the context when a thread is suspended and its registers are flushed. Registers may optionally be deallocated on last read by flagging a source operand with a consume bit.

Each register has a synchronization bit that is kept in a scoreboard. The scoreboard maintains the same mappings as the NSRF. The synchronization bit for a destination register is cleared when the operation writing that register is issued. The bit is set when the operations completes and the register is written. Registers that are written by remote load or move operations (operations that access the C-Switch) must first be cleared by the programmer at the destination with an explicit EMPTY operation. Like its register file, the scoreboard is a named state file, but access uses the same decoder mapping as the register files. The integer scoreboard has four read ports and 6 write ports. The floating-point scoreboard has four read ports and four write ports.

Each function unit within a cluster acts independently, selecting operations to issue from any thread in the active set. The control logic 67 of each unit (FIG. 4) is responsible for the following pipeline activities on each cycle:

1. Selecting a valid operation to issue from an active thread based upon the hardware thread priority. A valid operation must satisfy two conditions: (1) each of its operands is present, (2) all of the operations from the thread's previous instruction have issued.
2. Moving the next operation for the selected thread from the Operation Prefetch Buffer into the Operation Buffer.
3. Fetching the selected thread's next non-NOP (non-no-operation) operation from the Operation Cache into the Operation Prefetch Buffer.
4. Incrementing the LIP (Local Instruction Pointer) of the selected thread by the NOP offset specified in the operation just fetched.
5. Executing the operation selected on the previous cycle.
6. Writing local results into the local register file.
7. Presenting operation results to the C-Switch arbitration logic one cycle before the result is ready. This is to reserve the C-Switch channels and to validate the destination register's presence bit.
8. Stalling the pipeline if the C-Switch does not grant the interconnection resources. FIG. 4 shows the 5 stage integer unit pipeline and the associated control blocks. The register file 50 and its scoreboard 68 are not part of the operation unit and are shared with other units in the cluster. However, they are shown here to demonstrate how they fit into the pipeline.

The function unit has a five-stage pipeline of operation fetch (OF), register read (RR), synchronization (SZ), execution (EX), and write back (WB) stages. OF fetches an operation from the Operation Cache 70, RR reads the register values and checks the scoreboard to determine which of the source registers are ready, SZ holds operations waiting for register synchronization before being issued, EX executes the operation, and WB writes back the result.

During the operation fetch (OF) stage, an active thread addresses the operation cache 70 using an LIP 72 and places an operation into the operation prefetch buffer 74. The operation prefetch buffer holds fetched operations that are waiting to read the register file 50. The OF fetch logic determines which active thread accesses the operation cache by examining the operation that previously issued to the execution stage EX. Thus, the thread that issues an operation is the one that is next allowed to fetch an operation. Linking the operation issue determined in the SZ stage with the operation fetch performed in the OF stage permits a single thread to keep its pipeline full and issue an operation each cycle.

Each thread has a local Instruction Pointer (LIP) 72 in the operation unit. (Only four of the eight threads are illustrated for clarity of illustration.) The LIP is used to fetch non-NOP operations from the operation cache 70. The operation cache holds all of the operations for this operation unit. Combining the operation caches of all of the operation units yields the MAP's wide instruction cache. The instructions in the instruction cache are unpacked, meaning that the NOPs are explicitly present in the instructions. However, NOPs may be skipped by the instruction sequencing logic via an offset field in each operation.

Figure 5A:
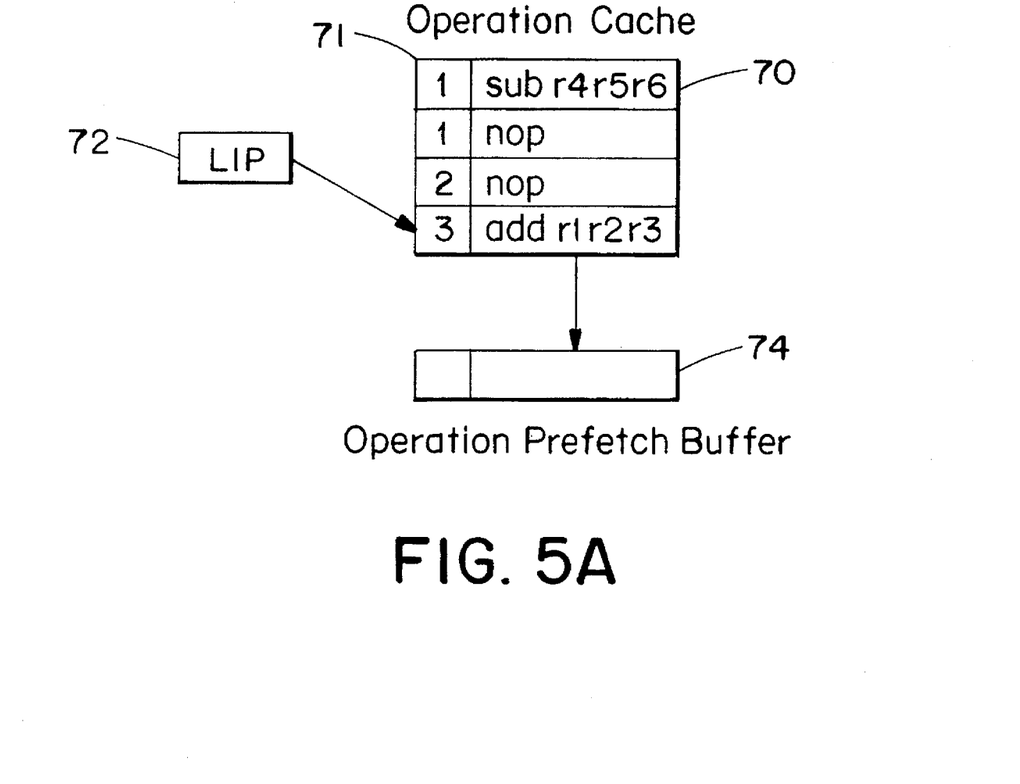
FIGS. 5A and illustrate the step of incrementing a local instruction pointer by a NOP offset.
Figure 5B:
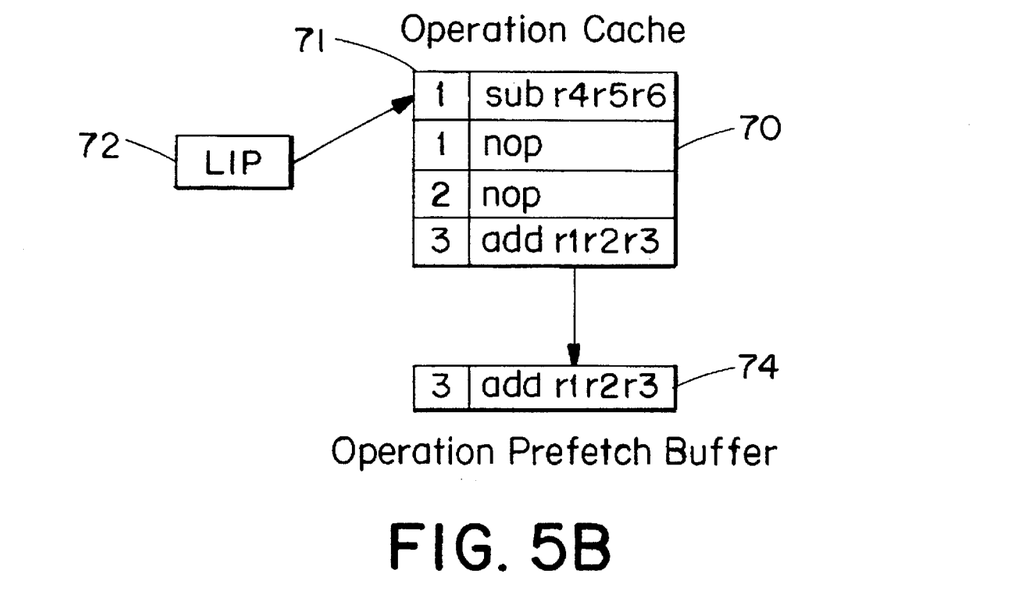

As illustrated in FIGS. 5A and 5B, the offset field 71 in each operation indicates how many instructions may be skipped before a useful operation for the unit may be found. This allows the operation cache bandwidth to be used to fetch only useful operations. The offset field is generated by the compiler.

In an example illustrated in FIG. 5A, a sequence of operations in a thread includes an add operation followed by two no-operations followed by a subtract operation. The sequence of operations is stored in the operation cache 70. The LIP register 72 for that thread initially points to the add operation. When the unit control logic 67 selects that thread for prefetch of an operation, the add operation to which the LIP points is fetched from the operation cache 70 and placed in the operation prefetch buffer 74 for that thread. The OF stage then increments the local instruction pointer 72 by the amount indicated in the offset field 71 of the add operation (3) so that the pointer now points to the next non-NOP operation, the subtract operation, as illustrated in FIG. 5B. Fetches of the NOPs are not made.

The operation cache has no knowledge of threads, but merely holds operations. The operations cache is shared by all of the threads. The operation prefetch buffer 74 holds a fetched operation for each thread slot before it proceeds to the operation buffer.

During the register read stage, an operation from the operation prefetch buffer 74 is loaded into read register 76, and reads its operands from the register file 50 and checks their validity in the scoreboard. These values are forwarded to the thread's position in the operation buffer 78 in the SZ stage and are further examined in the SZ stage. Because the presence information as well as register write values are forwarded to the operation buffer, the RR stage is the only portion of the pipeline that uses the register read ports.

During the synchronization (SZ) stage, the operation buffer is examined for valid operations. The operation buffer acts as a reservation station where operations sit until their operands arrive. Buffer 78 holds one operation, including operands when available, from each thread that is waiting to issue. It contains valid bits for each of its operands. As the scoreboard is updated, the valid bits in the operation buffer are updated in place.

Instruction sequencing logic within the unit control logic 67 maintains the requirement that all of the operations in instruction i must issue before any of the operations in instruction i+1 may issue. This logic is replicated in each function unit so that operation issue may be determined locally with a minimal amount of global control. In each unit control 67, an operation count register (OCR) (FIG. 6) counts the number of instructions that must issue before the next operation for the given thread may issue. Each thread slot has its own OCR on each function unit. When an operation issues from the SZ to the EX stage to be executed, the OCR is written with the offset to the next non-NOP operation. This information is encoded in the operation that was just selected. The logic then monitors the global NOT_STARTED line. Each time the line is deasserted, an instruction has finished issuing, and the OCR is decremented. When the OCR reaches 0, all of the previous instructions have issued and the thread's operation in the operation buffer may issue, pending satisfaction of its data dependencies. An operation becomes valid when all of its operands are valid and the OCR count reaches zero.

Figure 6A:
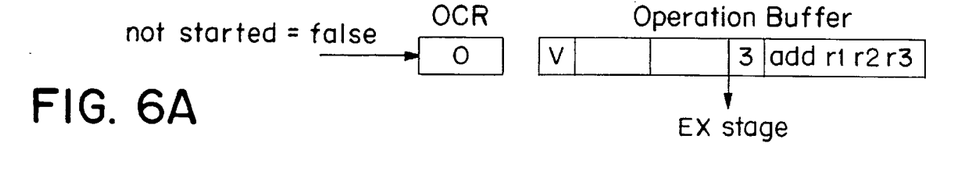
FIGS. 6A–6E illustrate use of an operation count register to suspend issuance of operations during cycles of NOPs.
Figure 6B:
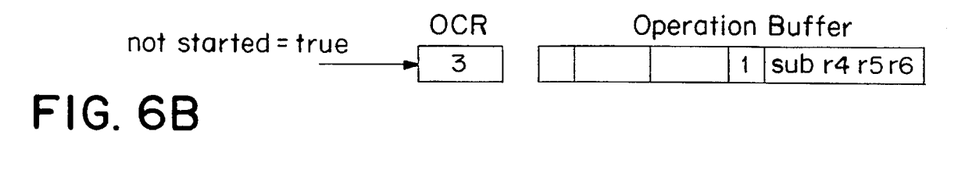
Figure 6C:
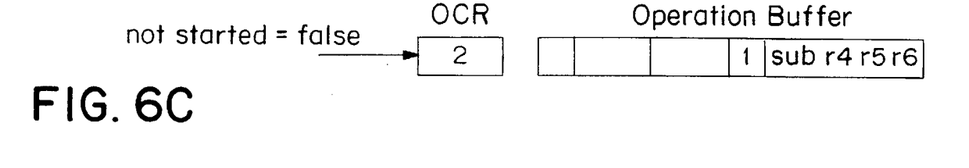
Figure 6D:
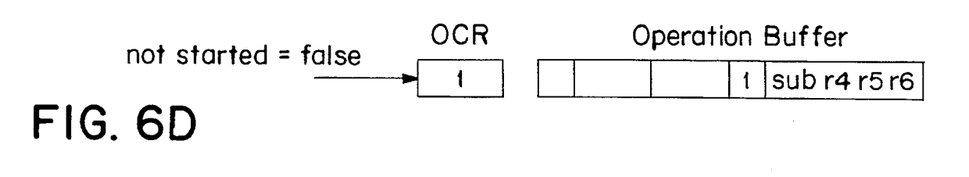
Figure 6E:
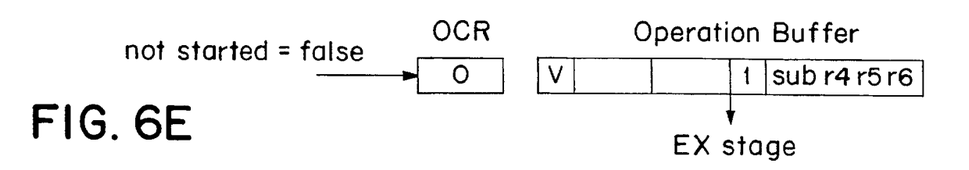

FIGS. 6A–6E illustrate a specific example of use of the offset field in the OCR for instruction sequencing. In FIG. 6A, the add operation is initially valid in the operation buffer and is able to issue. At this time, the offset field, in this case 3, is copied into the OCR as illustrated in FIG. 6B. Subsequently, as illustrated in FIGS. 6C, 6D and 6E, every cycle that NOT_STARTED is false, a full multiple-operation instruction has successfully issued and the OCR is decremented. When the OCR reaches zero as illustrated in FIG. 6E, the subsequent operation of subtract becomes valid and may issue when all operands are available.

Note that the NOP offset is first taken from a prefetched operation and used as illustrated in FIGS. 5A and 5B to increment the local instruction pointer. Later in the pipeline, that same offset is taken from an issuing operation and used as illustrated in FIGS. 6A–E to set the OCR and assure that the NOPs are in fact performed. Because the LIP is incremented by the offset in the prefetch stage, the subtract operation is placed in the operation buffer when the add operation issues to the execution stage as illustrated in FIG. 6B, but is itself suspended from issuance until the OCR decrements to zero.

The local instruction pointer LIP is initially set by the thread instruction pointer TIP from the global control unit. Thereafter, the LIP is incremented locally by the offsets from the fetched operations and the operations are issued locally in loose synchronization with other units through the OCR and NOT_STARTED line. The TIP on the other hand is incremented in response to the NOT_STARTED line once per multiple-operation instruction after all operations of that instruction have issued. If a thread is suspended, only the TIP need be saved.

If a valid operation is found in the operation buffer, it is sent to the execution stage. If more than one valid operation is found, the operation with the highest priority is selected. The thread slots are assigned a fixed priority in hardware. As many as eight threads may be active simultaneously on the MAP chip. Four thread slots are for user code, two slots are reserved for event handling, and two slots are reserved for message handling. The local control of a function unit is responsible for interleaving the operations from the threads. It does this by using a fixed hardware priority scheme. On each cycle, the interleaving hardware selects a valid operation from the highest priority thread available. Message and event slots are ordered and have the highest priority, while the user slots have the lowest. Round robin scheduling is used to service the user slots.

Register synchronization bits are written one cycle before the value is actually produced so that an operation may issue and meet the forwarded operand at the EX stage.

When issued by the SZ stage, the operation along with its arguments proceeds to the execution (EX) stages for execution in the ALU 80. All operations, including arithmetic operations, loads, stores, and branches, are executed during EX stages. Depending on the type of operation performed, more than one cycle may be required for execution. For example, a floating-point multiply may require five cycles to execute, while an integer addition may only need one. Some operations, such as memory references, take a variable number of cycles to complete. Since the scoreboard manages data dependencies, out of order completion of operations is permitted.

The results of an operation are written to the destination register file in the write back (WB) stage. A destination register may reside in the local register file or in a remote register file. Writes to the local register file can use the local bypass paths to skip the WB stage, allowing results to be used on the next cycle. This incurs no pipeline delay penalty, since the scoreboard was updated one cycle earlier to allow the operation that uses this result to reach the EX stage.

Specifically, when an operation issues from the SZ stage to the EX stage, the operands are applied through multiplexers 84 and 86 to the ALU 80. Simultaneously, the op code, destination register identification and source register identification are made available to the ALU on lines 88. The destination register identified on line 88 is applied through a combiner 90 to validate the output operand in the scoreboard 68 and in the operation buffer 78. Thus, this validation takes place prior to issuance of the operation output. That output is then read back directly through the combiner 92 and the multiplexers 84 and 86 to the ALU for use in the next cycle. The output is also applied to the operation buffer for updating the operand in the event that the same thread is not selected in the next cycle. The operand in the register file is updated from the output of the write back register 82 through combiner 94.

Bypassing results to a remote function unit incurs a single cycle penalty. The result is not sent directly from the EX stage of the producing function unit. Instead, the result must proceed to the WB register 82 and through the C-Switch. Since the C-Switch was scheduled one cycle earlier for performance of arbitration, the result is able to proceed directly to the remote function unit where it is placed in the register file and can be forwarded to the first EX stage for immediate use. Specifically, the valid bits are updated in the receiving scoreboard and operation buffer from the C-Switch through combiner 90. The data in the register file and operation buffer are updated from the C-Switch through combiners 94 and 92.

Exceptional conditions may be detected during the execution of an operation that may delay the availability of a result (stalls) or prevent the operation from completing (faults). These conditions are divided into three classes: early stalls, late stalls, and faults.

With an early stall, if an operation unit detects the condition at least one full cycle before the result would normally be produced, it simply delays the data ready signal that precedes the availability of data by one cycle until one cycle before the data is to appear. Thus the scoreboard in the SZ pipeline stage will ensure that all operations that depend on the result of the delayed operation will be inhibited from issuing until the result is produced.

Late stalls occur when an operation detects that its result will be delayed during the last cycle of its execution, after the data ready signal has been transmitted. In this case, the stalling operation unit asserts a fast cancel signal some setup time before the end of the cycle. As the name implies, this cancel signal cancels the previously issued ready signal and prevents any operation that may have been enabled by the cancelled ready signal from issuing and possibly signalling its own data ready if it is a one-cycle operation.

If operation issue is inhibited by a cancel signal, the affected pipeline will issue no operation the next cycle. The cancel signal arrives too late in the cycle to choose an alternative to the disabled operation.

The table below illustrates the pipeline timing of a late stall. Operation 1 normally completes in two cycles. It signals that its result will be available at the beginning of cycle X2 by asserting the data ready signal (denoted by a "|"). Later during cycle X2 it detects that it will be unable to complete and cancels the availability of its result by asserting the cancel signal (denoted by a "V") before the setup period at the end of the cycle. The cancel prevents operation 2 from issuing in cycle 6, possibly leaving the pipeline idle during this cycle. Operation 2 remains in the SZ stage. It receives a second data ready signal in cycle 7 and as this signal is not cancelled, it issues in cycle 8. Note the advantage of having the synchronization stage follow the read register stage and thus directly precede the execution stage. Issuance of a next operation may be cancelled without the need for backing out of any intermediate stage.

| Cycle | 1 | 2 | 3 | 4 | 5 | 6 | 7 | 8 |
|---|---|---|---|---|---|---|---|---|
| 1 | OF | RR | SZ | X1 | X2 | X3 | X4 | WB |
|   |    |    |    |    | \| | V  | \| |    |
| 2 |    | OF | RR | SZ | SZ | SZ | SZ | X1 |

When an operation cannot complete (at all or without software assistance) it terminates its operation and invokes a fault exception handler in an event thread slot. If the exception is detected after the data ready signal has been asserted, a cancel signal must be asserted as with a late stall. Unlike the late stall, however, the data will not be produced during a later cycle. A faulting instruction never asserts the data ready signal.

A faulting operation asserts a fault signal to the global control unit. The pipeline containing the operation freezes until this signal is acknowledged. The GCU serializes faults so they are acknowledged and handled one at a time.

When the GCU acknowledges the fault, the faulting pipeline asserts a fault code that identifies the type of the fault and the number of fault arguments. The GCU then writes the information from the fault (fault identifier, faulted operation, faulted operands, etc.) into the event queue of the appropriate event thread slot. It must sequence the fault arguments one at a time to the EQ using the memory unit of the faulting pipeline.

The Cluster Switch (C-Switch) 24 is used to transport data form one cluster to another. It consists of four buses, one for each cluster. Each integer and floating-point function unit is capable of driving each C-Switch bus. In addition, each cache bank as well as the external memory interface may write to registers using the C-Switch. The C-Switch performs arbitration to determine which units will be allowed to write the bus. For the arithmetic units in the clusters, arbitration is performed one cycle before the result arrives in the WB pipeline stage. The scoreboard is updated at this time as well. This allows those operations using the result to issue and meet up with the result at the EX stage without additional delay. The cache banks also reserve the C-Switch resources one cycle before the data is delivered on a load operation. The cache optimistically makes this reservation before it has determined whether the access is a hit. If the access misses the cache, the result is cancelled and the issue of the consuming instruction is inhibited.

Arbitration is performed using a series of priorities. The external memory interface always has the highest priority. The cache banks have the next highest priority. Priority rotates among the cache banks to resolve conflicts. Finally the arithmetic units in the clusters have the lowest priority. Priority rotates among the function units as well. A three bit counter is needed to rotate among the eight function units trying to access the C-Switch. If an arithmetic unit is denied access to the resources, the unit is stalled and prevented from issuing an operation on the next cycle. A conflict between memory banks stalls the next memory reference coming into the cache bank.

The Global Control Unit 26 holds the globally visible state of each thread slot, aids in the sequencing of instructions, and handles fault sequencing. Thread state for each slot is held in a Thread Status Word (TSW) bank and a Thread Instruction Pointer (TIP) bank. Each thread's TSW contains:

1. IMASK: records which operations from the current instruction have issued.
2. Condition registers and synchronization bits.

Each thread has eight condition registers. Each register consists of two bits: 1 synchronization bit and 1 value bit (TRUE or FALSE). A condition register may be written by the units of only one cluster. Any unit may read the value on the dedicated wires going to each function unit. This allows all of the units to read the condition information simultaneously and without delay.

When a thread is evicted from a slot, the IMASK is updated by examining the state of the NOT_STARTED signals asserted by each function unit. Those function units which have not yet executed the operation from the current instruction assert the thread's NOT_STARTED line. When a thread suspends, the NOT_STARTED state from each unit is copied into the IMASK to indicate whether the operation needs to be issued or skipped when the thread is restarted.

Each TIP holds the address of the instruction that the thread is currently executing. A thread's TIP is incremented when the thread slot's NOT STARTED line is deasserted. During execution, the LIPs may race ahead due to the NOP offset count in the individual operations, but the TIP indicated what the thread is executing. When a taken branch occurs, the TIP and all of the function unit's LIPs are updated together.

The global controller holds some additional state that is associated with a thread slot, but is not saved to memory when a thread is evicted. Each thread slot has a Timeout Count Register (TCR) that counts the number of cycles since the thread occupying that slot has issued an instruction. It can detect instruction issue by snooping on the thread's NOT_STARTED line. When the TCR exceeds the value in the Timeout Limit Register (TLR), a trap is taken and the thread may be evicted from its active thread slot.

The global control unit also contains the HALT and ACQUIRED bits for each thread slot. A HALT bit indicates whether the thread slot context is currently in use. This gets reset when a thread begins running in the slot, and set when the thread is finished using the slot. The ACQUIRED bit indicates whether the slot has been atomically acquired by a system thread. An acquired slot may be loaded and launched by a system thread. The HALT and ACQUIRED bits are stored as Hardware Status Word (HSW) which can be read and written through configuration space.

While this invention has been particularly shown and described with references to preferred embodiments thereof, it will be understood by those skilled in the art that various changes in form and details may be made therein without departing from the spirit and scope of the invention as defined by the appended claims.

What is claimed is:

1. A very long instruction word parallel data processing system comprising:

a plurality of processing units; and memory having stored therein sequential multiple-operation instruction words for each of plural threads of computation, each instruction word comprising plural fields, each field identifying an operation for a respective one of the plurality of processing units such that all operations identified by a multiple operations instruction word may be executed simultaneously on respective processing units with processing of a single thread;

each processing unit comprising a synchronizer for selecting one of plural threads of computation for execution in that unit, the unit then executing the operation identified in the respective field of a next instruction word for the selected thread of computation, the synchronizer allowing parallel units to simultaneously execute operations from different thread instruction words such that execution of multiple-operation instruction words for plural threads is interleaved across the plural units;

each processing unit comprising a processing pipeline which includes the synchronizer as one stage thereof and a read register stage which precedes the synchronizer stage, the read register stage reading operands from a register file and supplying those operands to an operation buffer, the operation buffer storing operations with operand data for each of plural threads of computation prior to execution, the synchronizer stage dynamically selecting an operation for execution after its operands have been stored in the operation buffer.

2. A system as claimed in claim 1 wherein the processing pipeline comprises a circuit for directly writing operand data output from the pipeline into the operation buffer.

3. The system of claim 1 wherein the register file comprises a flag for indicating when valid data is not present in the register file, the flag being set to indicate that data is not present during the latency of an operation.

4. The system of claim 1 wherein each processing pipeline comprises an operation fetch stage ahead of the synchronization stage, the operation fetch stage fetching a next operation for a thread of computation which is selected for execution by the synchronizer stage.

5. The system of claim 1 further comprising a control signal linking the synchronizers of plural processing units for each thread of computation, the control signal indicating whether all operations of an instruction word have been issued.

6. The system of claim 5 further comprising a register for indicating the number of no operation cycles between operations of a processing unit and means for suspending issuance of a next operation until a count of issued multiple-operation instruction words corresponds to the number of no operations.

7. The system of claim 1 wherein the multiple-operation instruction words comprise no operation offsets to indicate a number of no operations which follow an operation of the instruction word, and the synchronizer suppresses issuance of operations through issuing cycles corresponding to the no operations indicated by the no operation offset.

8. A system as claimed in claim 1 wherein the synchronizer assures that all operations of an instruction word in a thread are executed by the plural units before any unit executes an operation of the subsequent instruction word of the same thread.

9. A very long instruction word parallel data processing system comprising:

a plurality of processing units; and memory having stored therein sequential multiple-operation instruction words for each of plural threads of computation, each instruction word comprising plural fields, each field identifying an operation for a respective one of the plurality of processing units such that all operations identified by a multiple operations instruction word may be executed simultaneously on respective processing units with processing of a single thread;

each processing unit comprising a synchronizer for selecting one of plural threads of computation for execution in that unit, the unit then executing the operation identified in the respective field of a next instruction word for the selected thread of computation, the synchronizer allowing parallel units to simultaneously execute operations from different thread instruction words such that execution of multiple-operation instruction words for plural threads is interleaved across the plural units;

wherein the processing units are grouped in clusters with instruction words spanning the clusters, each cluster of processing units sharing a register file for plural threads of computation which is separate from register files of other clusters for the same threads of computation such that the processing units of each cluster read from the register file of only that cluster, the system further comprising means for writing from a processing unit of one cluster to the register file of another cluster.

10. A system as claimed in claim 9 wherein each processing unit comprises a processing pipeline which includes the synchronizer as one stage thereof.

11. A system as claimed in claim 10 wherein the synchronizer stage comprises an operation buffer for storing operations with operand data for each of plural threads of computation prior to execution, the operation buffer storing operations with operand data for each of plural threads of computation prior to execution, the synchronizer stage dynamically selecting an operation for execution after its operands have been stored in the operation buffer.

12. A system as claimed in claim 10 wherein the processing unit pipeline further comprises a read register stage which precedes the synchronization stage, the read register stage reading operands from a register file and supplying those operands to an operation buffer.

13. The system of claim 12 wherein the register file comprises a flag for indicating when valid data is not present in the register file, the flag being set to indicate that data is not present during the latency of an operation.

14. The system of claim 10 further comprising a control signal linking the synchronizers of plural processing units for each thread of computation, the control signal indicating whether all operations of an instruction word have been issued.

15. The system of claim 9 further comprising a cluster bus system for providing direct writing of data from the output of one cluster to the register file of another cluster within a thread of computation.

16. The system of claim 15 wherein the cluster bus system comprises a separate bus for writing data into each cluster, the cluster bus system arbitrating between data transfers from plural clusters to a single cluster.

17. A system as claimed in claim 9 wherein the processing units execute an operation which causes transfer of data from one cluster to the register of another cluster within a thread of computation.

18. A system as claimed in claim 9 wherein the register file comprises a flag for indicating when valid data is not present in the register file, the flag being set to indicate that data is not present during the latency of an operation, a processing unit executing an operation which sets a flag in a register of a destination cluster to indicate that valid data is not present prior to an operation which writes data from one cluster to the register file of the destination cluster.

19. A very long instruction word parallel data processing system comprising:

a plurality of processing units grouped in clusters with instruction words spanning the clusters, each cluster of at least one processing unit sharing a register file for plural threads of computation which is separate from register files of other clusters for the same threads of computation such that the processing units of each cluster read from the register file of only that cluster, the system further comprising means for writing from a processing unit of one cluster to the register file of another cluster; and memory having stored therein sequential multiple-operation instruction words for each of plural threads of computation, each instruction word comprising plural fields spanning the clusters, each field identifying an operation for a respective one of the plurality of processing units such that all operations identified by a multiple operation instruction word may be executed simultaneously on respective processing units with processing of a single thread;

each processing unit comprising a processing pipeline including:

a read register stage for reading operands from a register file and supplying those operands to an operation buffer for each of plural threads of computation prior to execution;

a synchronization stage following the read register stage for selecting one of plural threads of computation for that processing unit and issuing the operation identified in the respective field of a next instruction word for the selected thread of computation, the synchronizer stage allowing parallel units to simultaneously issue operations from different thread instruction words such that issuance of multiple-operation instruction words for plural threads are interleaved across the plural units; and an execution stage for executing operations issued by the synchronizer stage.

20. A system as claimed in claim 19 wherein the processing units execute an operation which transfers data from one cluster to the register file of another cluster within a thread of computation.

21. The system of claim 20 wherein the register file comprises a flag for indicating when valid data is not present in the register file, the flag being set to indicate that data is not present during the latency of an operation, and a processing unit executes an operation which sets the flag in a register of a destination cluster to indicate that valid data is not present prior to the operation which transfers data from one cluster to the register file of the destination cluster.

22. The system of claim 21 further comprising a control signal linking the synchronizers of plural processing units for each thread of computation, the control signal indicating whether all operations of an instruction word have been issued.

23. A system as claimed in claim 19 wherein the synchronizer assures that all operations of an instruction word in a thread are executed by the plural units before any unit executes an operation of the subsequent instruction word of the same thread.

24. A method of very long instruction word parallel processing comprising:

provifing plural sequences of multiple operation instruction words, each sequence being for a thread of computation and each instruction word comprising fields for identifying plural operations able to be performed in parallel for the respective thread of computation such that all operations identified by a multiple operation instruction word may be executed simultaneously on respective processing units with processing of a single thread; and processing operations of plural threads of computation in shared parallel processors such that, in a processing cycle, the parallel processors may execute operations from a common instruction word in parallel and may process operations from different instruction words of different threads of computation such that execution of threads is interleaved across the plural processors;

wherein the operations are processed in parallel processor pipelines, the method comprising reading operands from a register file, supplying those operands to an operation buffer, and selecting an operation from the operation buffer for execution, the step of selecting being by a synchronizer which allows parallel units to simultaneously execute operations from different thread instruction words, the operation buffer storing operations with operand data for each of plural threads of computation prior to execution, the synchronizer stage dynamically selecting an operation for execution after its operands have been stored in the operation buffer.

25. A method as claimed in claim 24 wherein the parallel processors are grouped in clusters with instruction words spanning the clusters, each cluster sharing a separate register file, the method further comprising directly writing data from the output of one cluster to the register file of another cluster within a thread of computation through a cluster bus system.

26. A method as claimed in claim 24 further comprising providing a no operation offset in an instruction word to indicate a number of no operations which follow an operation of the instruction word, automatically incrementing an instruction pointer by the no operation offset such that the no operations are not fetched, and suppressing issuance of operations through issuing cycles corresponding to the no operations as indicated by the no operation offset.

27. A method as claimed in claim 24 wherein the synchronizer assures that all operations of an instruction word in a thread are executed by the plural units before any unit executes an operation of the subsequent instruction word of the same thread.

28. A method of very long instruction word parallel processing comprising:

providing plural sequences of multiple operation instruction words, each sequence being for a thread of computation and each instruction word comprising fields for identifying plural operations able to be performed in parallel for the respective thread of computation such that all operations identified by a multiple operation instruction word may be executed simultaneously on respective processing units with processing of a single thread; and processing operations of plural threads of computation in shared parallel processors such that, in a processing cycle, the parallel processors may execute operations from a common instruction word in parallel and may process operations from different instruction words of different threads of computation such that execution of threads is interleaved across the plural processors, the parallel processors being in clusters with instruction words spanning the clusters, each cluster of processing units sharing a register file for plural threads of computation which is separate from register files of other clusters for the same threads of computation such that the processing units of each cluster read from the register file of only that cluster, the system further comprising means for writing from a processing unit of one cluster to the register file of another cluster.

* * * * *